(12) United States Patent
Cohen Bengio et al.

(10) Patent No.: US 8,902,236 B1
(45) Date of Patent: Dec. 2, 2014

(54) IMPLICIT SURFACE DEFORMER IN A DEFINED DIRECTION

(75) Inventors: Julien F. Cohen Bengio, San Francisco, CA (US); Kaori Ogino, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 428 days.

(21) Appl. No.: 13/190,362

(22) Filed: Jul. 25, 2011

(51) Int. Cl.
*G06T 15/70* (2006.01)

(52) U.S. Cl.
USPC .......................................................... 345/473

(58) Field of Classification Search
None
See application file for complete search history.

(56) References Cited

U.S. PATENT DOCUMENTS

2007/0268293 A1* 11/2007 Miller et al. .................. 345/473
2009/0251462 A1* 10/2009 Kaytis et al. .................. 345/419

* cited by examiner

*Primary Examiner* — Kimbinh T Nguyen
*Assistant Examiner* — Raffi Isanians
(74) *Attorney, Agent, or Firm* — Kilpatrick Townsend & Stockton LLP (57) ABSTRACT

In one aspect, a method performed by one or more processes executing on a computer system, the method includes displaying in a user interface at least a portion of a 3D object model and one or more surface controls that collectively and implicitly define a control surface that is positioned in 3D space relative to, and capable of deforming, the 3D object model, each surface control having a single associated direction, directions of deformations of the control surface based on the associated directions. The method further includes receiving input from a human animator defining a change to the implicitly defined control surface relative to the 3D object model. The method further includes in response to the received input, updating the user interface to display the 3D object model as deformed by the changed implicitly defined control surface.

20 Claims, 10 Drawing Sheets

IMPLICIT SURFACE DEFORMER IN A DEFINED DIRECTION

BACKGROUND

This document relates to computer animation. Generally speaking, computer animation is the process of generating video sequences using computer graphics creation software executing on a computer system. Often in computer animation, a scene of three dimensional (3D) objects is rendered into a two dimensional (2D) projection of the scene to generate a single frame of the animation sequence, the objects in the scene are then manipulated or moved to new positions corresponding to the next frame in the animation sequence, and the rendering process is repeated to generate that next frame.

Some objects may have an associated animation rig that helps to manipulate the object based on animation controls provided by the rig. An animator user can set values for the animation controls to drive the animation rig. For example, a facial rig may have rig controls for groups of muscles, and the muscles can expand or contract based on a value assigned to corresponding rig controls. An animator may set rig values for a subset of frames called keyframes. The keyframes may be selected as, for example extreme positions for the model's pose, expression, or shape. For frames between the keyframes, rig values may be interpolated from the surrounding keyframes. This interpolation may create smooth transitions of rig control values, producing smooth animation of the object.

SUMMARY

In one aspect, a method performed by one or more processes executing on a computer system, the method includes displaying in a user interface at least a portion of a 3D object model and one or more surface controls that collectively and implicitly define a control surface that is positioned in 3D space relative to, and capable of deforming, the 3D object model, each surface control having a single associated direction, directions of deformations of the control surface based on the associated directions. The method further includes receiving input from a human animator defining a change to the implicitly defined control surface relative to the 3D object model. The method further includes in response to the received input, updating the user interface to display the 3D object model as deformed by the changed implicitly defined control surface.

Implementations can include any, all, or none of the following features. The at least one surface control each has an associated size, shape, and location in 3D space relative to the 3D object model. The implicitly defined control surface varies with changes to one or more of the surface control's respective sizes, shapes and locations in 3D space. The user interface display corresponds to a keyframe scene and further including displaying in real time an animation sequence that includes the keyframe scene. The surface controls represent bone structure in the 3D object model, the 3D object model represents skin, and the deformations of the 3D object model by the control surface provide for skin sliding over bones in the 3D object model. Magnitudes of deformations of the 3D object model by the control surface between surface controls are interpolated linearly from one surface control. The change to the implicitly defined control surface comprises a change to be applied to at least one of the surface controls, the change including rotation, translation, and scale deformations applied to the at least one of the surface controls. The 3D object model represents a man-made object. The surface controls include fall-off parameters that further collectively and implicitly define the control surface.

In one aspect, a computer program product tangibly embodied in an information carrier and includes instructions that when executed by a processor perform a method includes displaying in a user interface at least a portion of a 3D object model and one or more surface controls that collectively and implicitly define a control surface that is positioned in 3D space relative to, and capable of deforming, the 3D object model, each surface control having a single associated direction, directions of deformations of the control surface based on the associated directions. The computer program product further includes receiving input from a human animator defining a change to the implicitly defined control surface relative to the 3D object model. The computer program product further includes in response to the received input, updating the user interface to display the 3D object model as deformed by the changed implicitly defined control surface.

Implementations can include any, all, or none of the following features. The at least one surface control each has an associated size, shape, and location in 3D space relative to the 3D object model. The implicitly defined control surface varies with changes to one or more of the surface control's respective sizes, shapes and locations in 3D space. The user interface display corresponds to a keyframe scene and further including displaying in real time an animation sequence that includes the keyframe scene. The surface controls represent bone structure in the 3D object model, the 3D object model represents skin, and the deformations of the 3D object model by the control surface provide for skin sliding over bones in the 3D object model. Magnitudes of deformations of the 3D object model by the control surface between surface controls are interpolated linearly from one surface control. The change to the implicitly defined control surface comprising a change to be applied to at least one of the surface controls, the change including rotation, translation, and scale deformations applied to the at least one of the surface controls. The 3D object model represents a man-made object. The surface controls include fall-off parameters that further collectively and implicitly define the control surface.

In one aspect, a system includes a computer device includes a memory configured to store instructions. The system further includes a processor configured to execute the instructions to perform a method includes displaying in a user interface at least a portion of a 3D object model and one or more surface controls that collectively and implicitly define a control surface that is positioned in 3D space relative to, and capable of deforming, the 3D object model, each surface control having a single associated direction, directions of deformations of the control surface based on the associated directions. The system further includes receiving input from a human animator defining a change to the implicitly defined control surface relative to the 3D object model. The system further includes in response to the received input, updating the user interface to display the 3D object model as deformed by the changed implicitly defined control surface.

Implementations can include any, all, or none of the following features. The at least one surface control each has an associated size, shape, and location in 3D space relative to the 3D object model. The implicitly defined control surface varies with changes to one or more of the surface control's respective sizes, shapes and locations in 3D space. The user interface display corresponds to a keyframe scene and further including displaying in real time an animation sequence that includes the keyframe scene. The surface controls represent bone structure in the 3D object model, the 3D object model represents skin, and the deformations of the 3D object model by the control surface provide for skin sliding over bones in the 3D object model.

Details of one or more implementations are set forth in the accompanying drawings and the description below. Other features and potential advantages will be apparent from the description and drawings, and from the claims.

Various implementations of the subject matter described here may provide one or more of the following potential advantages. For example, complex control surfaces may be implicitly defined by surface controls that can be animated by animation rig controls. In one or more implementations, using implicit surfaces for 3D object model displacements may be computationally more efficient than using explicit surfaces. And using implicit surfaces of a 3D object model displacement can enable real-time display of animation that includes implicit-surface displacement. In one or more implementations, use of implicit surfaces can enable realistic skin sliding of 3D object models.

DESCRIPTION OF DRAWINGS

FIGS. 4A-6 are schematic diagrams of solving for control surfaces used for deformations.

Like reference symbols in the various drawings indicate like elements.

DETAILED DESCRIPTION

An animation system can include a 3D object model with surface controls that implicitly define a control surface. The 3D object models represent the components of a virtual, computer controlled environment. A collection of vertices, edges between the vertices, and the faces between the edges can define each 3D object model. The vertices of the 3D object model can be deformed, that is, moved in the environment, to animate the 3D object model.

In some cases, the 3D object model can be deformed along a control surface in a direction determined by the surface controls. The control surface can represent a rigid element of a 3D object model that presses against a flexible element of a 3D object model. For example, when humans or animals move, their skin slides over rigid bone structure. This behavior can be modeled by creating control surfaces for bones in 3D object models that represent the humans or animals. When the 3D object model moves, the flexible skin of the 3D object model can deform and slide over the bone control surface, creating the same effect in the virtual environment as is observed in real bone and skin interactions.

The control surface can be implicitly defined by closed, 2D shapes called surface controls. An animation sequence can translate, rotate, and scale the surface controls, changing the control surface and deformation as the 3D object model is animated. For example, the human or animal 3D object model may move an arm or leg, and movements to the bones of the human or animal can be created by translating and rotating the control surface. As the control surface changes, the flexible portions of a 3D object model can be deformed according to the control surface. One use of the control-surface deformation is to simulate skin sliding in real time.

Figure 1:
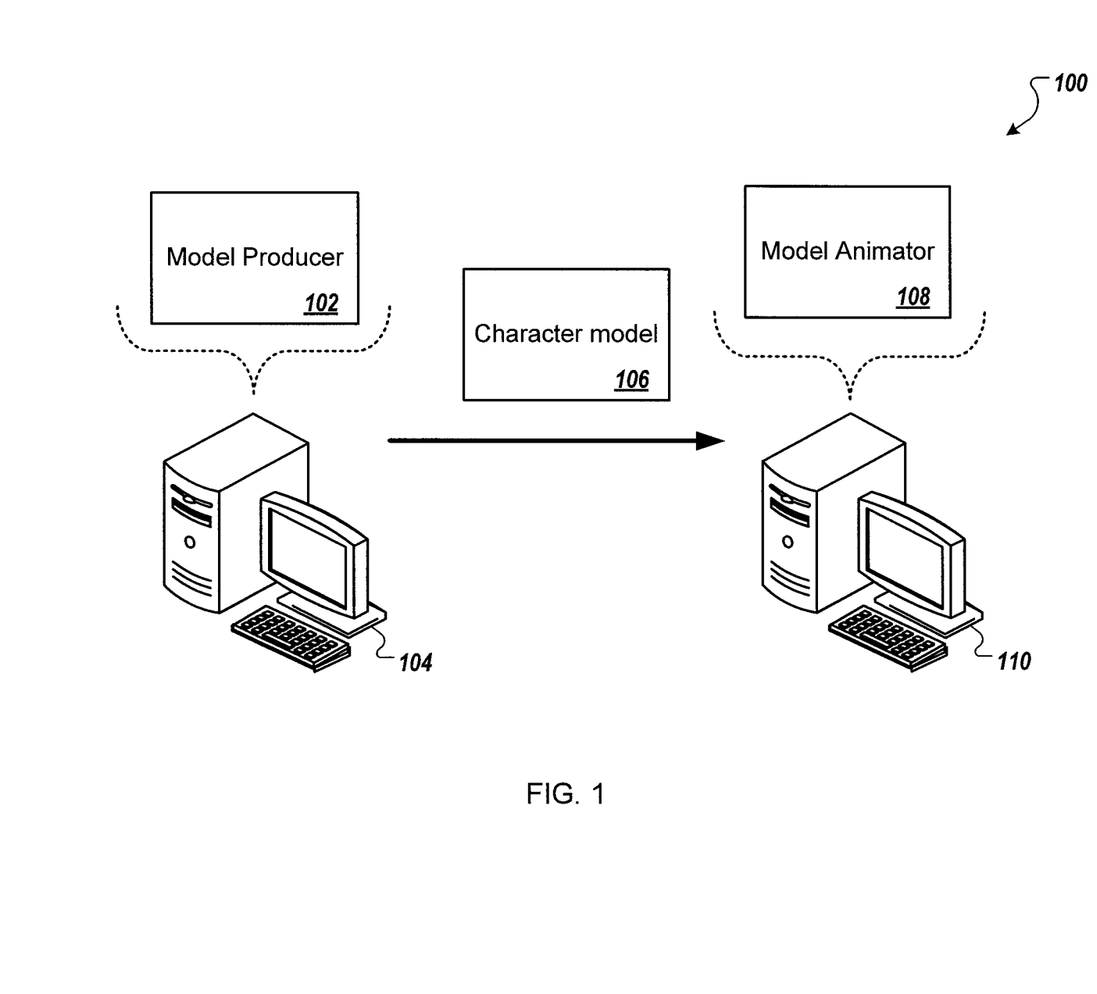
FIG. 1 shows an example of an animation development system.

FIG. 1 shows an example of an animation development system 100 that provides a user (e.g. a creature technical director, rigger, or animator) with functionality such as being able to create various types of geometrical 3D object models for use in projects such as offline applications (e.g., animated film productions) and online applications (e.g., video game titles, virtual environments, etc.). Generally, the system 100 can be considered a type of animation pipeline that includes stages for producing animations. The models produced by the pipeline may represent a variety of characters and other types of objects that provide animated performances in projects under production. One or more techniques may be used for producing such models. For example, data may be collected from various sources (e.g., via motion capture systems), created (e.g., electronically sculpted) by a modeler or similar individual and retrieved (e.g., from character libraries). Techniques that utilize blend shapes, skinning, etc. may be used for incorporating features into one or more models. For example, a blend shape may be incorporated into the model to assist a range of representations being provided such as a range of facial expressions (e.g., from a rest expression to an expression of extreme happiness).

In general, a blend shape provides a collection of relative displacements of vertices to define a particular facial expression. For example, an animated character's face can be represented as a collection of vertices (e.g., a three-dimensional mesh) and each vertex may be positioned to define a particular geometry. Typically, the vertices are placed in rest positions to define a neutral facial expression (referred to as a rest geometry) and may be deformed to produce a range of expressions. From this neutral expression, a blend shape defines the displacement of each vertex to produce each expression included in the range. For example, applying the displacements to the vertices of the neutral expression, another expression (e.g., a smiling face, a frowning face, etc.) is produced. Geometrical meshes or other types of spatial representations may be used to define such 3D object models (or other types of objects) with varying levels of detail. In this exemplary arrangement, production of such models is represented as being provided by a model producer 102 that is executed on a computer system 104. User input (e.g., via one or more user interfaces) and data from information sources (e.g., one or more storage units, other computer systems, etc.) in communication (e.g., via the Internet) with the computer system 104 may be used for model production. Further, once produced, the models may be archived in one or more storage structures and devices for later retrieval and use in project production (e.g., feature film or video game title creation).

In this arrangement, upon being produced, a 3D object model 106 is passed along the animation pipeline for additional processing, e.g., the model is used to produce one or more animations. To provide such functionality in this arrangement, a model animator 108 is executed by another computer system 110 and allows a user (e.g., a creature technical director, rigger, or animator) to select and control the 3D object model 106 for producing animations. For example, the user may interact with the computer system 110 (e.g., through one or more interfaces) to deform or initiate other types of adjustments (e.g., changing facial expressions, body poses) to the 3D object model 106 for creating a particular character performance. From such detailed crafting, various types of content may be included in animations produced by the model animator 108, for example, one or more characters (e.g., moving or stationary) or other types of objects (e.g., clothing) may be represented in animations. From one of many examples, an animation may be produced that represents facial features of a character (provided by the 3D object model 106) for an online application such as a video game. Over a series of produced frames, the animation may illustrate the character changing its facial expressions (e.g., facial movements in relation to speech).

During this animation stage, skin elements of the 3D object model 106 may be shown to slide over bone structure of the 3D object model 106. These bone elements may be defined as control surfaces in the 3D object model 106 that are animated by the model animator 108. In some cases, the bone elements may be represented by surface controls in the shape of rings. In this system, each frame can be solved independent of any frames that come before or after. That is the frames need not be simulations that are past frame dependent.

Figure 2A:
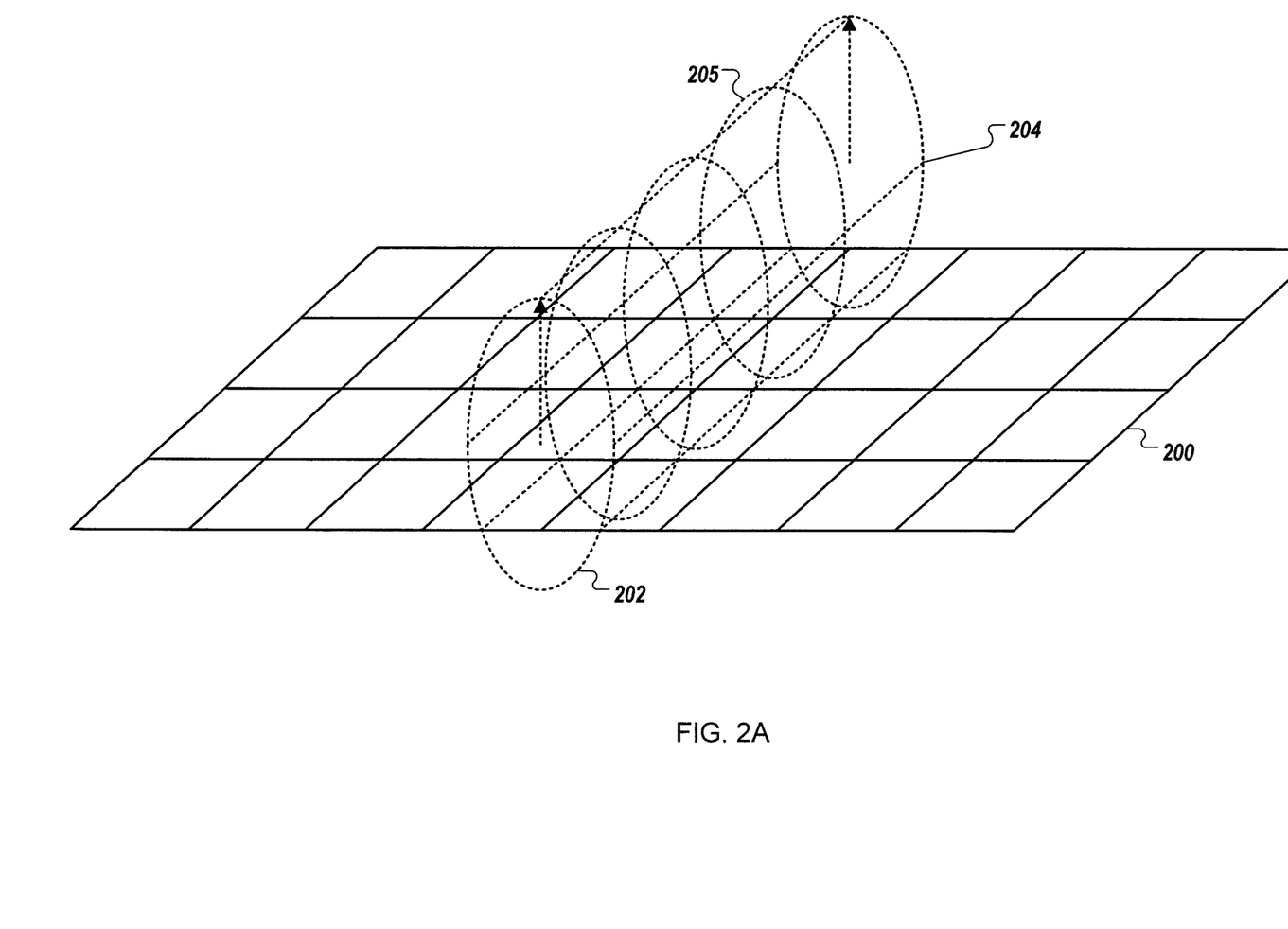
FIGS. 2A-2C show examples of surfaces in a model that are deformed by a control surfaces defined by surface controls.
Figure 2B:
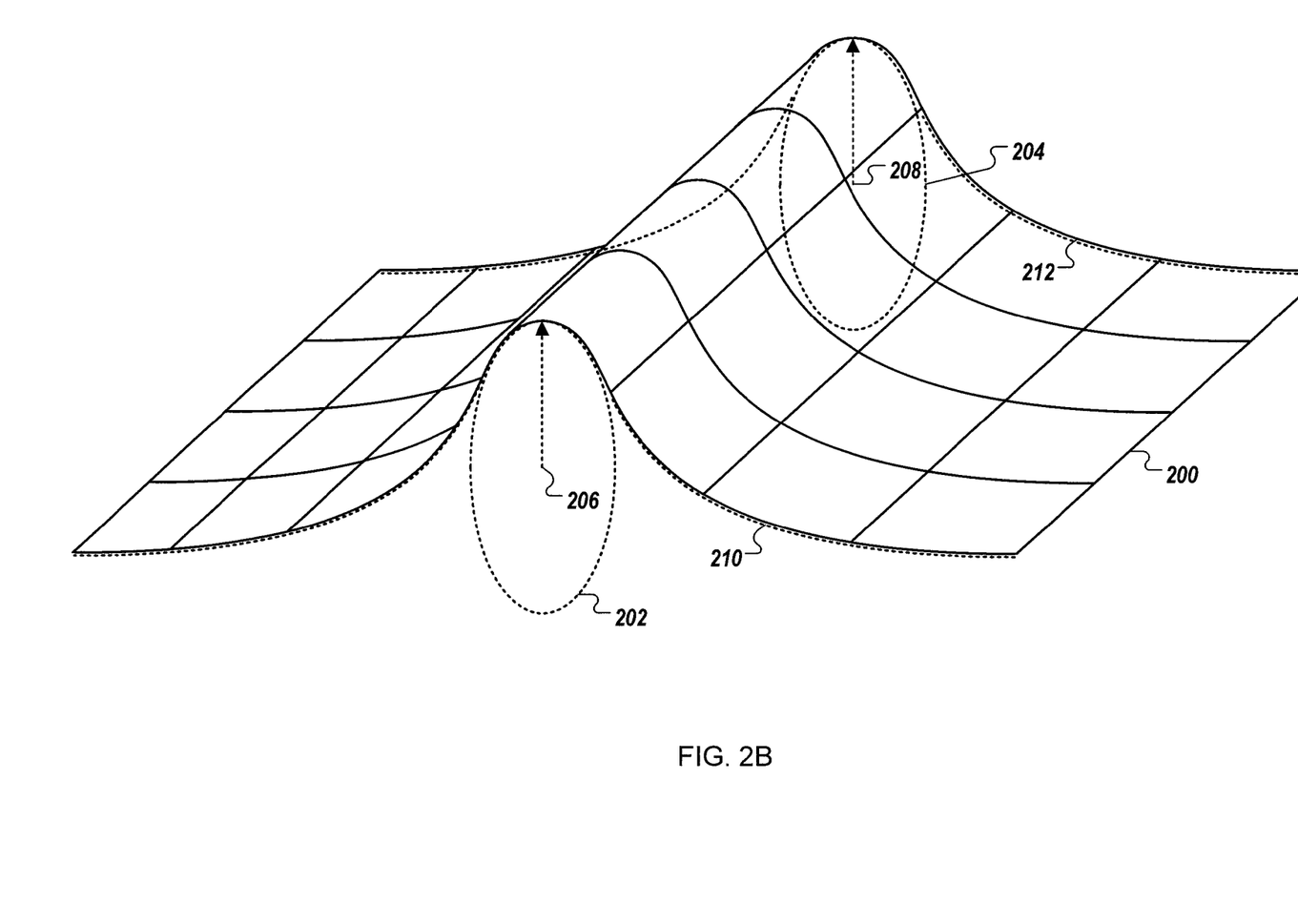
Figure 2C:
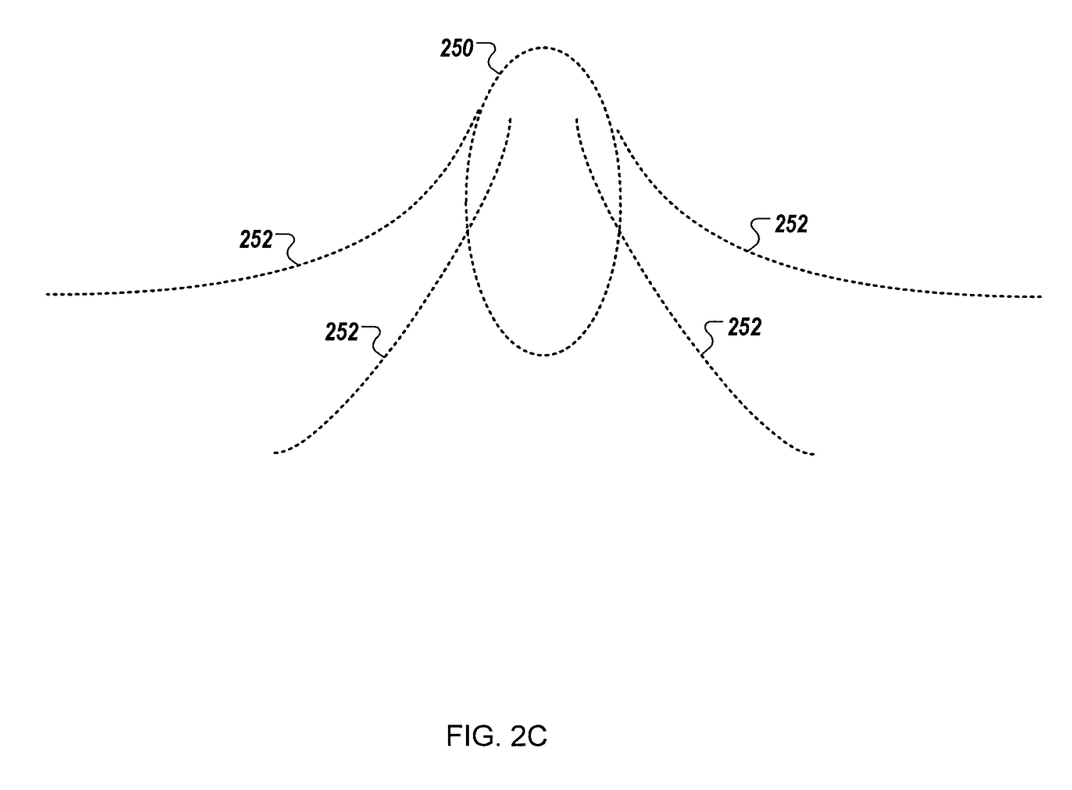

FIG. 2 shows examples of surfaces in a model that are deformed by a control surfaces defined by two surface controls. In FIG. 2A, the surface is in a base state, that is, it has not been deformed by the control surface. In FIG. 2B, the surface has been deformed by the control surface. In this example, the model is a human character animated for an online (e.g. video game) or offline (e.g. motion picture) video sequence. The model includes rib bones and skin that slides over the rib bones as the model moves. The model skin, where near or over the rib, deforms according to the shape of the rib. This interaction simulates real interactions of real human skin and bones for presentation in the video sequence. In FIG. 2C, the surface has been deformed by a controls surface defined by a single surface control.

A mesh 200 represents the skin in the model. The mesh 200 here is a mesh of rectangles, but other meshes are possible, such as a mesh of triangles. For illustrative purposes, a low resolution rendering of the mesh 200 is shown with a reduced number of vertices and edges, and it will be understood that the edges in the mesh 200 may be straight line segments. In other implementations, other types of surfaces are possible. For example, a non-uniform rational basis spline (nurbs) surface or curves may be used instead of the mesh 200.

A rib bone is represented by a control surface 205 implicitly defined by surface controls 202 and 204. For clarity, the control surface 205 is shown only in FIG. 2A. The surface controls 202 and 204 here are ovals, but any closed, two dimensional geometric shape is possible. The control surface 205 can be interpolated for at every vertex in the mesh 200 between the surface control 202 and the surface control 204. For each vertex of the mesh 200, a control-surface deformation can be determined and applied to deform the vertex past the control surface 205. The direction of the implicit-surface deformation can be determined by interpolating a direction 206 associated with the surface control 202 and a direction 208 associated with the surface control 204.

Fall-off shapes 210 and 212 can extend the control surface 205 past the surface controls 202 and 204. They may represent, for example, tension forces applied to skin represented by the mesh 200 as the skin slides over ribs or other structures. Mathematical functions (e.g. in f(x)=y format) or geometric shapes (e.g. splines) may be used to define the fall-off shapes 210 and 212. In some implementations, the fall-off shapes allow a smooth transition of deformation between points deformed by the control surface 205 and points near the control surface 205. Abrupt, large, and quick deformations or changes to deformations may appear as disjointed movement of vertices in an animation sequence, sometimes called "popping", which may be considered a visual artifact. One source of popping may be a vertex of the mesh 200 transitioning onto the control surface 205, if the control surface 205 did not include the fall-off shapes 210 and 212. With circular surface controls 202 and 204, the slope of the control surface 205 would be infinite (vertical) at the edge of the control surface 205. Another source of popping may be, for one frame only, a point would be pushed in a different direction than in the surrounding frames. With fall-off shapes 210 and 212 and processes described herein to deform in the area of the surface controls, and not in the fall-off area, when smoothly moving surface controls 202 and 204, deformations in the mesh 200 are kept smooth and may not display this type of popping.

In FIG. 2C, only a single surface control 250 is used to define a control surface to deform the mesh 200. For example, a circular control surface with a fall-off surface around the control surface may be used to simulate a single lump (e.g. a eye) under a deformable surface (e.g. an eyelid). In this example, a fall-off shape 252 extends around the surface control 250.

Figure 3:
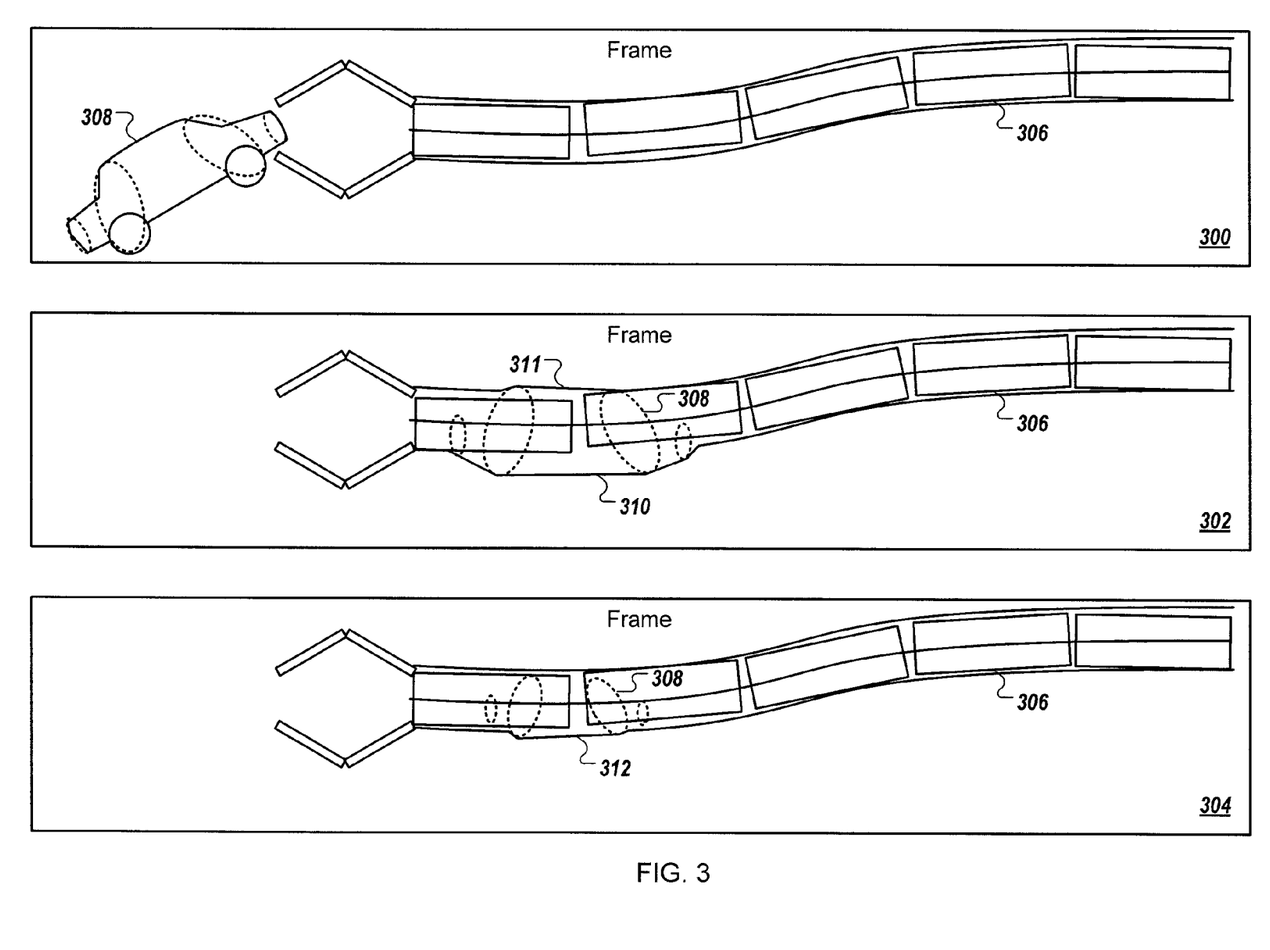
FIG. 3 shows an animated model containing an implicit deformation surface.

FIG. 3 shows an animated model containing an implicit deformation surface. In this example, a model of a robotic arm is animated to grab a car model, swallow the car into a cavity inside the arm, and to crush the car. This animation may be used for an online (e.g. video game) or offline (e.g. motion picture) video sequence. Frames 300, 302, and 304 show the robotic arm and the car at each of the grab, swallow, and crush animations, with control surfaces used to deform the arm in the frames 302 and 304.

A robotic arm 306 is a 3D object model that can includes a model surface representing an articulated arm, claws, and a hollow core. Animation may be applied to the robotic arm 306 to bend the arm and manipulate the claws. Additionally, animation may be applied to an automobile 308 that translates, rotates, and scales the automobile 308, including the surface controls of the automobile 308. These animations may include, for example, animation controls values received from a user, such as an animator, and/or motion capture values recorded from a motion performance.

The automobile 308 is a model that can include four surface controls that define a control surface for the automobile. The automobile 308 need not have any other structure (e.g. animation controls or a surface mesh), although those are possible.

In the frame 300, the robotic arm 306 holds the automobile 308 in its claw. Here, no portions of the surface of the robotic arm 306 are between any two of the surface controls, and no control-surface deformations are applied to the robotic arm 306.

Later in the video sequence, at the frame 302, the robotic arm 306 has swallowed the automobile 308. Between the frames 300 and 302, animation is applied to the automobile 308 to translate and rotate it. In this frame 302, portions of the robotic arm 306 are between the surface controls of the automobile 308. Control surfaces 310 and 311 are defined by the surface controls of the automobile 308, and the surface of the robotic arm 306 can be deformed past the control surface.

In the frame 302, the robotic arm 306 has been deformed to show that the automobile 308, which is inside the robotic arm 308, has volume and pushes vertically on the robotic arm 306. This volume appears as a bulge in the robotic arm 306 created by control-surface deformations applied to the robotic arm 306.

At the frame 304, later in the video sequence, the robotic arm 306 has crushed the automobile 308. Between the frames 302 and 304, animation for the crushing that scales the automobile 308 is applied. In other implementations, an animation may include any combination of translation, rotation, and scaling. In this frame 304, portions of the robotic arm 306 are between the surface controls of the automobile 308. A control surface 312 is defined by the surface controls of the automobile 308, and the surface of the robotic arm 306 can be deformed past the control surface.

The animation applied between the frames 302 and 304 can be created from input from a human animator. The input can specify a change to the surface controls of the automobile 308, or to the control surfaces 310-312 defined by those surface controls. In the first case, the human animator may use an input device to manipulate the location, orientation, and scale of the surface controls. In response, a computer system can calculate the controls surfaces 310-312 that are implicitly defined by the surface controls. In the second case, the human animator may use an input device to manipulate the control surfaces 310-312. In this case, the location, orientation, and scale of the surface controls of the automobile 308 can be calculated by a computer system so that they implicitly define the control surfaces 310-312.

Figure 4A:
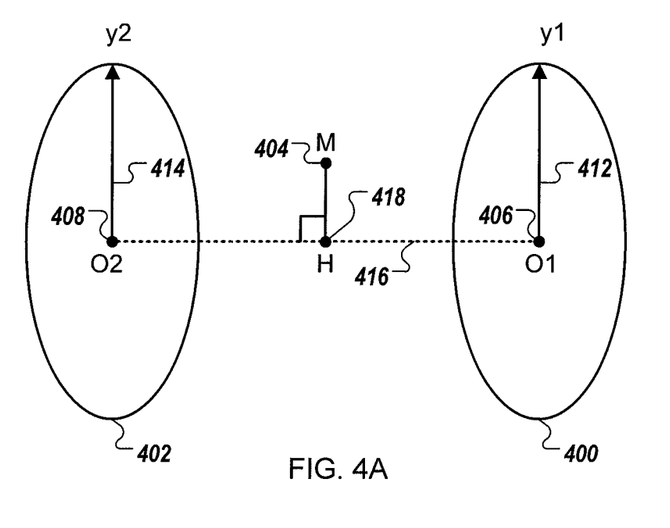
Figure 4B:
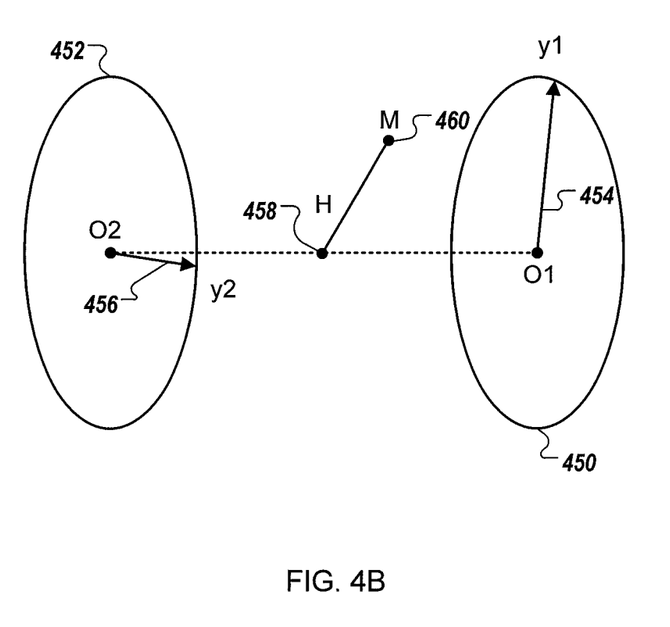

FIGS. 4A and 4B are schematic diagrams of solving for control surfaces used for deformations. In the diagram 4A, surface controls 400 and 402 are parallel, circular surface controls of the same size with associated directions in the same direction. The surface controls 400 and 402 define a control surface in a 3D object model. Point M 404 is a point to be deformed, for example a vertex in a mesh of the 3D object model. Point O1 406 is the center of the surface control 400 and point O2 is the center of the surface control 402. The surface controls 400 and 402 have an associated direction 412 and 414, respectively.

To identify surface controls that encapsulate point M 404, each surface control (here, surface controls 404 and 402, but more surface controls are possible in a 3D object model) is examined. For the surface control 400, a coordinate system is created. The Y axis is aligned with the associated direction 412 (here, toward the top of the page), the Z axis points toward the surface of the ring (here, along the line O1O2), and the X axis is in the third direction (here, out of the page). A similar coordinate surface is created for the surface control 402. A dot product for each surface control 400 and 402 can be calculated between the Z axis of the surface control 400 and 402 and a line from the center of the surface controls 400 and 402 (O1 406 and O2 406) and point M 404. The surface controls 400 and 402 can be identified as encapsulating the point M 404 because the dot products for the surface controls 400 and 402 have different signs (e.g. one is positive and one is negative).

Next, an intermediary surface control is calculated for the point M 404 that is an interpolation of the surface controls 400 and 402. A line O1O2 416 is projected from the centers of the surface controls 400 and 402. A point H 418 is the projection of point M 404 onto the line O1O2 416. A parameter "t" is calculated that is equal to $O1\ 406\ H\ 418 / \|O1\ 406\ O2\ 408\|$. A plane N is created that is normal to the Z axis of the surface controls 400 and 402. The point H 418 is a parallel to the plane N, so the following three equations are true:

$$(H\ 418\ M\ 404).N = 0$$

$$(H\ 418\ O1\ 406 + O1\ 406\ M\ 404).N = 0$$

$$-t*O1O2\ 416.N + O1\ 406\ M\ 404.N = 0 \rightarrow t$$

In the diagram 4B, surface controls 450 and 452 are parallel, circular surface controls with associated directions 454 and 456 in different directions. In this example, the direction of the projection of the point M 460 to create point H 458 is an interpolation of the associated directions 454 and 456. Point M 460 is equidistance from the surface controls 450 and 452, who's associated directions 454 (here, toward the top of the page) and 456 9 (here, out of the page) are offset by 110°. As such, the angle of projection of point M 460 is 55° (here, out of the page and toward the top of the page).

Figure 5:
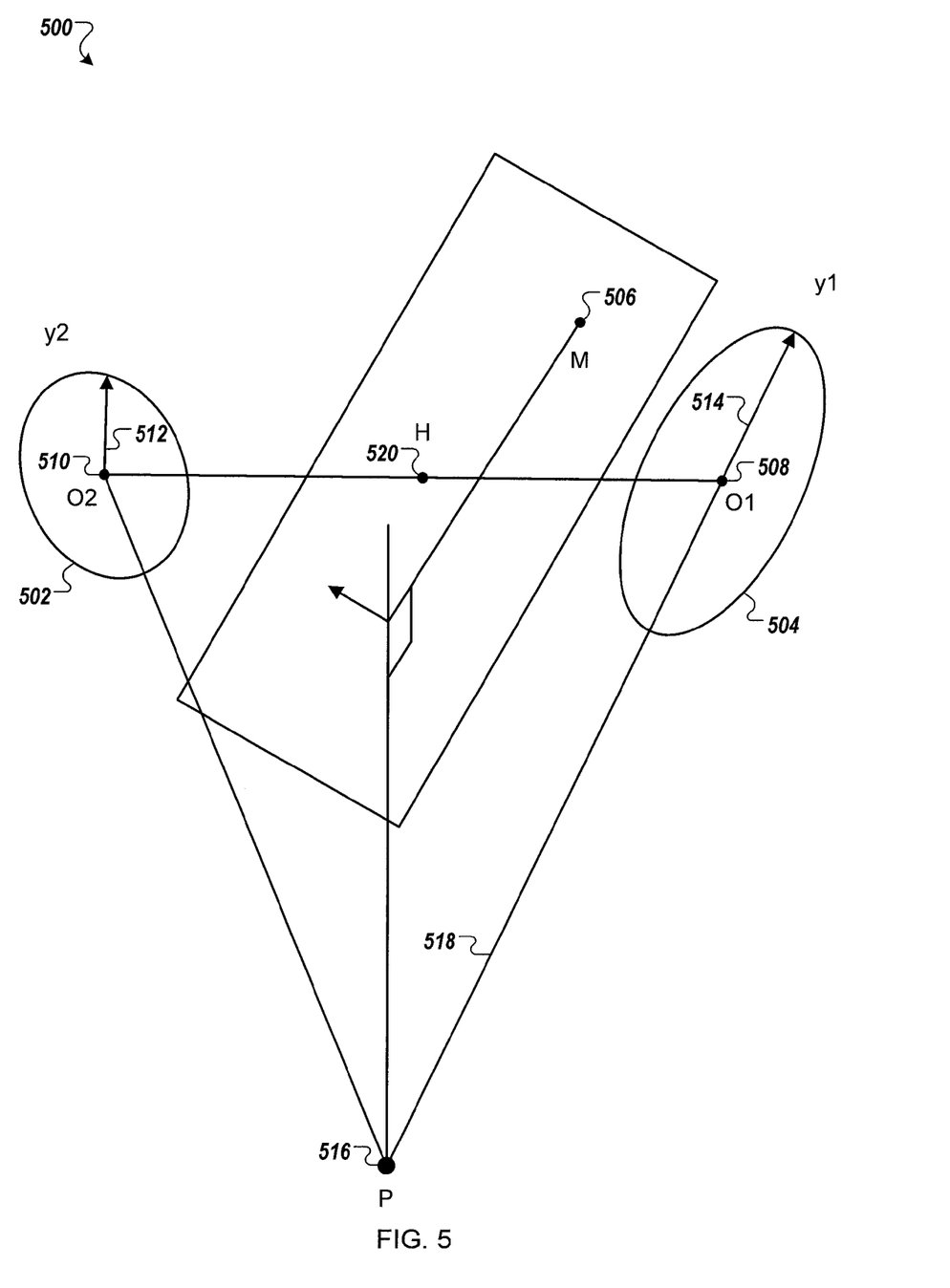

FIG. 5 is a schematic diagram 500 of solving for a control surfaces used for deformations. In the diagram 500, surface controls 502 and 505 are non-parallel surface controls of the different sizes and shapes with associated directions in different same directions. The surface controls 502 and 504 define a control surface in a 3D object model. Point M 506 is a point to be deformed, for example a vertex in a mesh of the 3D object model. Point O1 508 is the center of the surface control 504 and point O2 510 is the center of the surface control 502. The surface controls 502 and 504 have an associated direction 512 and 514, respectively. To identify surface controls that encapsulate point M 506, the surface controls of the diagram 500 can be examined similar to as described in FIG. 4A.

In the diagram 500, planes of the surface controls 502 and 504 intersect at an intersection line. A point P 516 is uniquely defined as the orthogonal projection of point O1 508 on that intersection line. In this example, O1P 518 is collinear with the associated direction 514, but they need not be.

A projection of M 506 onto O1P 518 is called "C". PC=b*InterDir, where b is an arbitrary variable, used in the equation to show that P belongs to the intersection direction, and InterDir is a normalized vector in the direction of the intersection line. Now, PC=b*InterDir, because C belongs to the Interdir, and CM 506.InterDir=0, because C is the projection of M 506. P 516 M 506=O1 508 M 506-O1 508 P 516, so P 516 M 506. InterDir=(P 516 C+C M 506).InterDir=P 516C.InterDir=b*InterDir.InterDir=b, since InterDir is a normalized vector. As P 516, M 506, and InterDir are known and uniquely defined, b can be found so that the location of C can be found.

The intersection of a point H 520 between O1 508 O2 510 and the plane M 506, C, O1P 518 can be found with the following equations. N is the normal to that plane, C H 520.N=0 so as O1 508 H 520=t*O1 508 O2 510→C O1 508.N+t*O1 508 O2 510.N=0.

The value of t provides an interpolation position between the surface controls 502 and 504 for a virtual frame between the surface controls 502 and 504 that would include M 506, and that would be rotated and scaled between the surface controls 502 and 504 according to t. In some implementations, the frame with M 506 can have a different center and rotation than the rotation of either of the surface controls 502 and 504. As the transition between surface controls 502 and 504 can be arbitrary and complex, the implicit surface defined by the surface control 502 and 504 can be similarly arbitrary and complex. That is, the relationship between surface controls 502 and 504 may or may not be constrained. They may be rotated, scaled, and displaced from each other. As a result, he implicit surface defined by the surface controls 502 and 504 may be arbitrary (e.g. of any shape) and complex (e.g. a complicated surface that would require many vertices and edges to define as a mesh). The calculation of t, to where the virtual frame intersects O1 508 O2 510 and where M belongs to that frame, can provide a simpler implicit surface between the surface controls 502 and 504. To calculate t, M 506 can be projected onto O1 508 O2 510, orthogonal to the direction of z of the interpolated frame (parallel to the plane xy of the interpolated frame). t=O1 508 M 506.dot(zDir)/O1 508 O2 510.dot(zDir), and H 520 M 506 can be deduced from t. For example, the rotation quaternion to rate from surface control 504 to 502 is found, and the rotation quaternion is interpolated to H 520. This provides an approximation of the frame at M 506, and the exact values oft and H 520 can be found for the frame place where M 506 intersects with O1 508 O2 510. The value zDir is normal to that frame, H 520 M 506=H 520 O1 508+O1 508 M 506, and HM=–t*O1 508 O2 510+O1 508 M 506.

Figure 6:
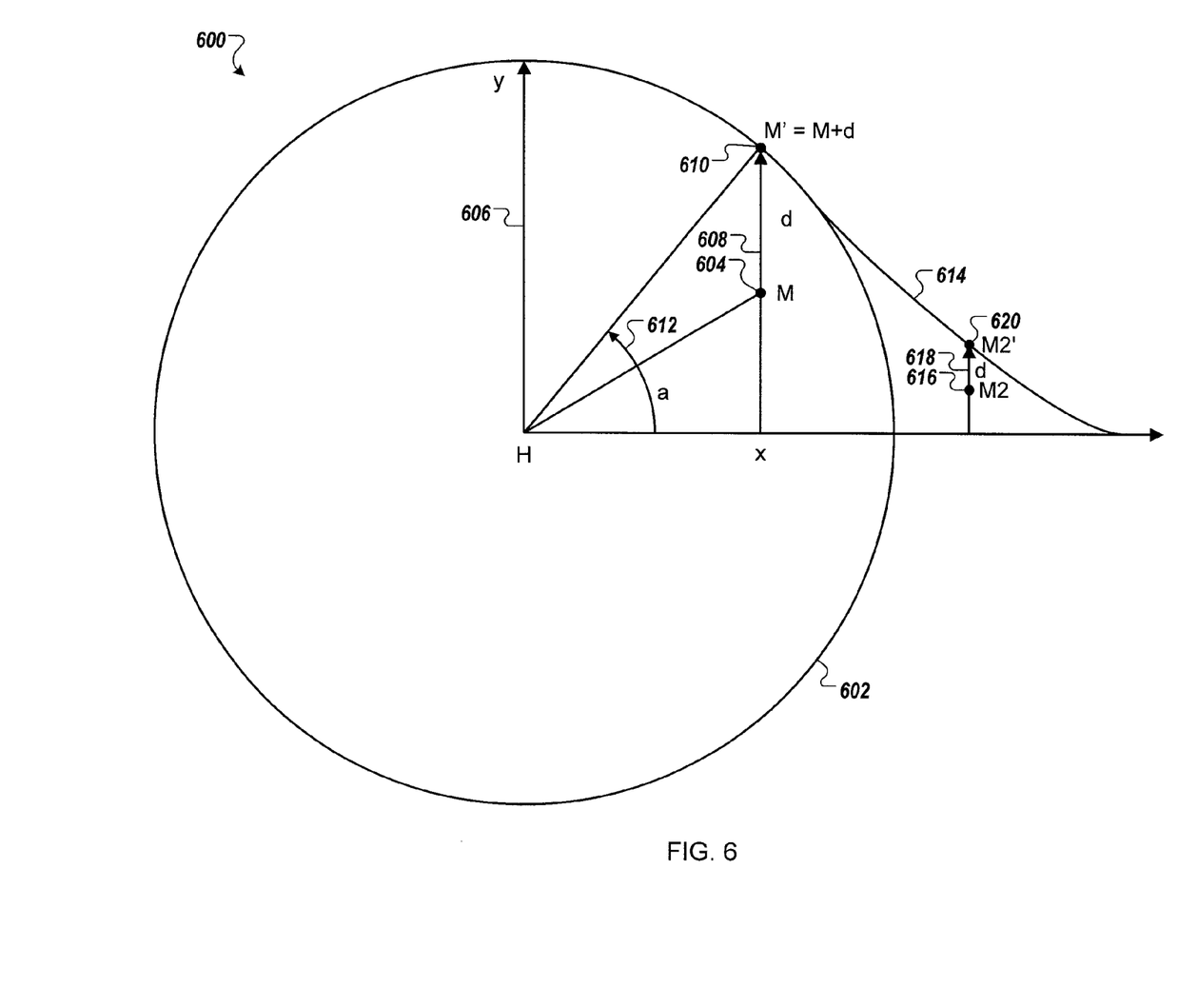

FIG. 6 is a schematic diagram 600 of solving for a control surface used for deformations. In the diagram 600, a surface control 602 is used to determine a surface control deformation to be applied to a point M 604. The surface control 602 may be a surface control in a 3D object model that is coplanar with the point M 604, or may be interpolated from such surface controls, as described in FIGS. 4 and 5. The point M 604 may be a point in a 3D object model, such as a mesh vertex.

The surface control 602 has an associated direction 606 (here, toward the top of the page). Points, such as point M 604, displaced by the surface control 602 can be displaced in the direction 606, as opposed to, for example, radially from the center of the surface control 602. In some cases, radial displacements may reduce or remove details and displacements in the same direction will better preserve the details of the implicit surface.

The point M 604 can be displaced a distance d 608 to point M' 610. An angle a 612 can be the angle from Hx to H M' 610. The cosine of the angle a 612 can be the projection of H M 604 on X axis (xDir) of the surface control 602 and calculated by the formula cos(a)=H M 604.dot(normalized xDir)/(length of xDir).

The value from the cos(a) can be clamped to −1 and 1, and sin(a) can be calculated form the cos(a) (e.g. sin(a)^2+cos(a)^2=1). The distance d 608 can be calculated with the equation d=(cos(a)*xDir+sin(a)*yDir)−H M 604. This distance d may be used as an control-surface deformation to be applied to the point M 604 to find the point M' 610.

A point M2 616 may be a point that lies coplanar with the surface control 602, outside the surface control 602, and below of a fall-off shape 614. Determining if the point M2 616 is below the fall-off shape 614 may depend on, for example, the way the fall-off shape 614 and the point M2 616 are defined. For example, if the fall-off shape 614 is defined as a spline, and the point M2 616 is defined relative to the point H or another point in an animation rig containing the control surface 602, the values of M2 616 and M2' 620 may be determined by displacing M2 616 in the direction of y 606 until it reaches the fall-off surface at M2' 620. For example, if the fall-off shape is defined by a function F(xDir), d may be found by substituting the value of xDir at M2 616 in the function. If the fall-off shape 614 is defined as a percentage that starts past the surface control 602, the distance d 618 can be a percentage of the xDir past the surface control 602. The distance d 618 may be used as an control-surface deformation to be applied to the point M2 616 to find the point M2' 620

Figure 7:
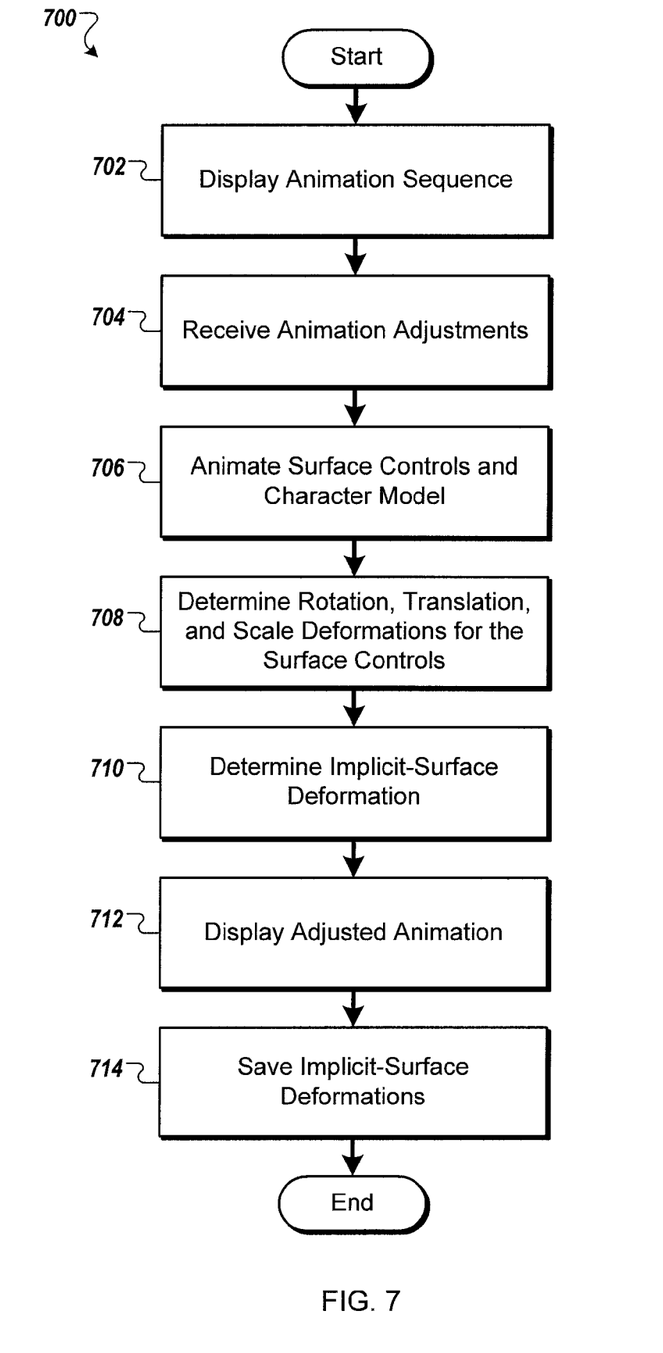
FIG. 7 is a flowchart of an example process for animating a model that includes a control surface deformer.

FIG. 7 is a flowchart of an example process 700 for animating a model that includes a control surface deformer. The process 700 can be performed by a system such as the model animator 108, and for illustrative purposes will be described with reference to the system 100. However, other systems may perform the process 700.

An animation sequence is displayed (702). The animation sequence may be displayed to an animator, and the animation sequence may contain control-surface based skin sliding for the skin sliding. For example, a human user tasked with animating a character in a video sequence can use the computer system 110 to view a draft or rough cut of an animation of a 3D object model. Using the animation user's artistic discretion, the animator may decide that a portion of the animation should be changed. One of the features the animator may observe during the action is the appearance of skin sliding in the animated 3D object model. For example, the animator may decide that the skin sliding, as shown in the animation sequence, could be improved aesthetically by changing the animation of the 3D object model.

Animation adjustments are received (704). The animation adjustments may be received from an animator, and may adjust the animation sequence, in part, by defining a change to a control surface in the animation sequence, relative to the 3D object model associated with the control surface. For example, the animator may adjust rig controls values that are associated with the animation model in a series of frames in the animation sequence. By changing those values, the animator can adjust the animation sequence. For example, an animator may increase or decrease an expression parameter for a facial rig, or increase or decrease a pose parameter for a body rig.

In some examples, the animation adjustments may be direct changes to one or more surface controls of the control surface. These animation adjustments may not adjust the 3D object model at all, or the animation adjustments may adjust the 3D object model in a different manner. In either case, the animation adjustments can define a change to the control surface relative to the 3D object model.

In some other examples, the animation adjustment may only indicate a change to the 3D object model and not a change to the control surface. For example, an animation rig of a human character can receive an animation adjustment to turn the character's head. As the character's head turns, the skin of the character slides over the character's stationary clavicle bone. The clavicle bone may remain stationary relative to a global perspective, but the change to the 3D object model creates change to the control surface relative to the 3D object model.

Surface controls and a 3D object model are animated (706). The surface controls define a control surface in the animation sequence. For example, in response to the animation adjustments received from the animator, the model animator 108 can recalculate the animation of the 3D object model. As part of this recalculation, animation for surface controls in the 3D object model (or another object in the scene) may be recalculated. The new animation created by the model animator 108 can include animating surface controls that define control surfaces within the animation sequence. In some examples, those control surfaces may represent internal structures of the 3D object model, such as bone, muscle, cartilage, motors, and mechanical frameworks.

Rotation, translation, and scale deformations are determined for the surface controls (708). For example, the surface controls may be bound to portions of the 3D object model, and as the 3D object model moves, the surface controls are rotated, translated, and/or scaled by the model animator 108 so that they remain bound to the 3D object model. For example, as a 3D object model's face goes through a series of expressions or speech movements, the model animator 108 may rotate, translate, and scale surface controls associated with the model's jawbone. In some examples, such as the globally stationary clavicle above, the rotation, translation, and scale deformations may be of zero magnitude or identical to rotation, translation, and scale deformations from the animation sequence of 702.

Control-surface deformations are applied to the model surface (710). The control-surface deformation directions are interpolated from two or more surface controls and are of a magnitude great enough to deform the model surface past the control surface. For example, to simulate skin sliding of the 3D object model's face over the jawbone, control-surface based deformations may be applied by the model animator 108 to the 3D object model's skin. Example schemes for determining direction and magnitude for the control-surface deformations are described in FIGS. 4-6.

The adjusted animation sequence is displayed (712). The adjusted animation sequence includes adjusted control-surface based skin sliding that has changed based on the change to the control surface. For example, the computer system 110 can display, to the same or a different animator user, the modified animation sequence with the skin sliding over the 3D object model's jawbone. The adjusted animation sequence is displayed to the animator in real-time. For example, as the animation user adjusts the animation, the model animator 108 may perform the actions to adjust the animation. In other implementations, the animation adjustments may be performed off-line and displayed to the animation user at a later time.

The control-surface deformations are stored to a computer readable medium in association with the 3D object model (714). For example, if the animation user approves of the adjusted animation, the computer system 110 can save the 3D object model, the adjusted animation, and the control-surface deformations to a hard disk, removable disk, or other storage device.

Figure 8:
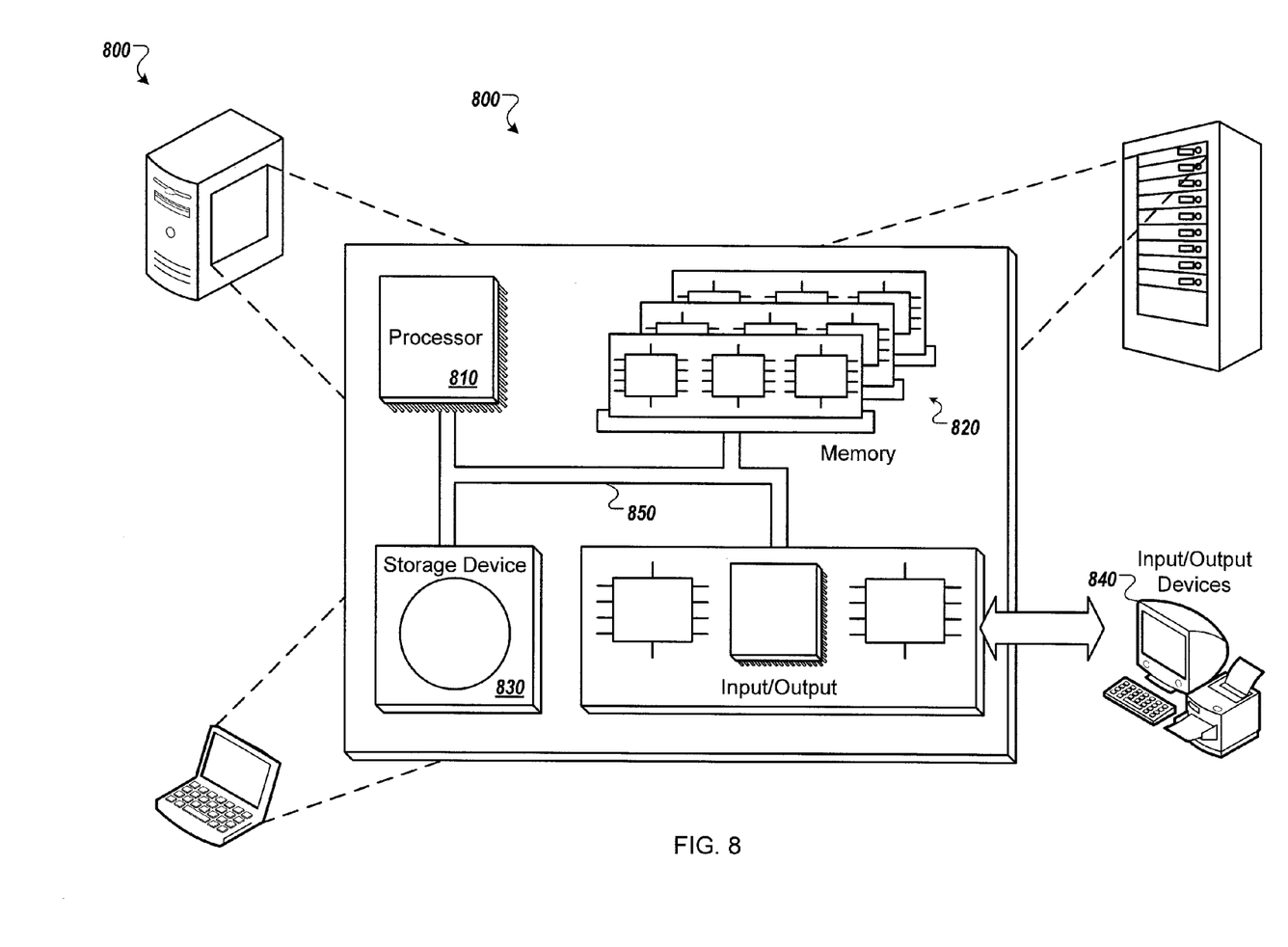
FIG. 8 is a schematic diagram that shows an example of a computing system that can be used in connection with computer-implemented methods and systems described in this document.

FIG. 8 is a schematic diagram that shows an example of a computing system 800. The computing system 800 can be used for some or all of the operations described previously, according to some implementations. The computing system 800 includes a processor 810, a memory 820, a storage device 830, and an input/output device 840. Each of the processor 810, the memory 820, the storage device 830, and the input/output device 840 are interconnected using a system bus 850. The processor 810 is capable of processing instructions for execution within the computing system 800. In some implementations, the processor 810 is a single-threaded processor. In some implementations, the processor 810 is a multi-threaded processor. The processor 810 is capable of processing instructions stored in the memory 820 or on the storage device 830 to display graphical information for a user interface on the input/output device 840.

The memory 820 stores information within the computing system 800. In some implementations, the memory 820 is a computer-readable medium. In some implementations, the memory 820 is a volatile memory unit. In some implementations, the memory 820 is a non-volatile memory unit.

The storage device 830 is capable of providing mass storage for the computing system 800. In some implementations, the storage device 830 is a computer-readable medium. In various different implementations, the storage device 830 may be a floppy disk device, a hard disk device, an optical disk device, or a tape device.

The input/output device 840 provides input/output operations for the computing system 800. In some implementations, the input/output device 840 includes a keyboard and/or pointing device. In some implementations, the input/output device 840 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A method performed by one or more processes executing on a computer system, the method comprising:
   displaying in a user interface of a computer system:
   at least a portion of a 3D object model comprising a model surface; and
   a plurality of surface controls that collectively and implicitly define a control surface that is positioned in 3D space relative to, and capable of deforming, the 3D object model, wherein each of the plurality of surface controls comprises a closed two-dimensional geometric shape;
   receiving input from a human animator defining a change to the closed two-dimensional shape of at least one of the plurality of surface controls that changes the implicitly defined control surface relative to the 3D object model; and
   in response to the received input, updating the user interface to display the model surface of the 3D object model sliding over the changed implicitly defined control surface.

2. The method of claim 1 in which the at least one surface control each has an associated size, shape, and location in 3D space relative to the 3D object model, and wherein the implicitly defined control surface varies with changes to one or more of the plurality of surface control's respective sizes, shapes and locations in 3D space.

3. The method of claim 1, wherein the user interface display corresponds to a keyframe scene and further comprising displaying in real time an animation sequence that includes the keyframe scene.

4. The method of claim 1, wherein the surface controls represent bone structure in the 3D object model, the 3D object model represents skin, and the deformations of the 3D object model by the control surface provide for skin sliding over bones in the 3D object model.

5. The method of claim 1, wherein magnitudes of deformations of the 3D object model by the control surface between surface controls are interpolated linearly from one surface control.

6. The method of claim 1, wherein the change to the implicitly defined control surface comprises a change to be applied to at least one of the surface controls, the change including rotation, translation, and scale deformations applied to the at least one of the surface controls.

7. The method of claim 1, wherein the 3D object model represents a man-made object.

8. The method of claim 1, wherein the surface controls include fall-off parameters that further collectively and implicitly define the control surface.

9. A non-transitory computer-readable medium having executable instructions stored thereon which, when executed by one or more processors, causes the one or more processors to:
   display in a user interface:
   at least a portion of a 3D object model comprising a model surface; and
   a plurality of surface controls that collectively and implicitly define a control surface that is positioned in 3D space relative to, and capable of deforming, the 3D object model, wherein each of the plurality of surface controls comprises a closed two-dimensional geometric shape;
   receive input from a human animator defining a change to the closed two-dimensional shape of at least one of the plurality of surface controls that chances the implicitly defined control surface relative to the 3D object model; and
   in response to the received input, update the user interface to display the model surface of the 3D object model sliding over the changed implicitly defined control surface.

10. The non-transitory computer-readable medium of claim 9 in which the at least one surface control each has an associated size, shape, and location in 3D space relative to the 3D object model, and wherein the implicitly defined control surface varies with changes to one or more of the plurality of surface control's respective sizes, shapes and locations in 3D space.

11. The non-transitory computer-readable medium of claim 9, wherein the user interface display corresponds to a keyframe scene and further comprising displaying in real time an animation sequence that includes the keyframe scene.

12. The non-transitory computer-readable medium of claim 9, wherein the surface controls represent bone structure in the 3D object model, the 3D object model represents skin, and the deformations of the 3D object model by the control surface provide for skin sliding over bones in the 3D object model.

13. The non-transitory computer-readable medium of claim 9, wherein magnitudes of deformations of the 3D object model by the control surface between surface controls are interpolated linearly from one surface control.

14. The non-transitory computer-readable medium of claim 9, wherein the change to the implicitly defined control surface comprises a change to be applied to at least one of the surface controls, the change including rotation, translation, and scale deformations applied to the at least one of the surface controls.

15. The non-transitory computer-readable medium of claim 9, wherein the 3D object model represents a man-made object.

16. The non-transitory computer-readable medium of claim 9, wherein the surface controls include fall-off parameters that further collectively and implicitly define the control surface.

17. A system comprising:
   one or more processors; and
   one or more memories comprising instructions stored thereon, which when executed by the one or more processors, causes the one or more processors to:
   display in a user interface:
   at least a portion of a 3D object model comprising a model surface; and
   a plurality of surface controls that collectively and implicitly define a control surface that is positioned in 3D space relative to, and capable of deforming, the 3D object model, wherein each of the plurality of surface controls comprises a closed two-dimensional geometric shape;
   receive input from a human animator defining a change to the closed two-dimensional shape of at least one of the plurality of surface controls that chances the implicitly defined control surface relative to the 3D object model; and
   in response to the received input, update the user interface to display the model surface of the 3D object model sliding over the changed implicitly defined control surface.

18. The system of claim 17 in which the at least one surface control each has an associated size, shape, and location in 3D space relative to the 3D object model, and wherein the implicitly defined control surface varies with changes to one or more of the plurality of surface control's respective sizes, shapes and locations in 3D space.

19. The system of claim 17, wherein the user interface display corresponds to a keyframe scene and further comprising displaying in real time an animation sequence that includes the keyframe scene.

20. The system of claim 17, wherein the surface controls represent bone structure in the 3D object model, the 3D object model represents skin, and the deformations of the 3D object model by the control surface provide for skin sliding over bones in the 3D object model.

* * * * *